United States Patent [19]

Ando

[11] Patent Number: 4,984,225

[45] Date of Patent: Jan. 8, 1991

[54] SYSTEM FOR APPLYING MAGNETIC FIELD TO OPTO-MAGNETIC MEMORY

[75] Inventor: Hideo Ando, Kawasaki, Japan

[73] Assignee: Kabushiki Kaisha Toshiba, Kawasaki, Japan

[21] Appl. No.: 174,358

[22] Filed: Mar. 28, 1988

[30] Foreign Application Priority Data

Mar. 31, 1987 [JP] Japan .................................. 62-78620
Mar. 31, 1987 [JP] Japan .................................. 62-78663
Mar. 31, 1987 [JP] Japan .................................. 62-78668
Mar. 31, 1987 [JP] Japan .................................. 62-78673

[51] Int. Cl.[5] ........................ G11B 13/04; G11B 11/10
[52] U.S. Cl. ........................................ 369/13; 360/114
[58] Field of Search .................... 369/13; 360/59, 114; 365/122

[56] References Cited

U.S. PATENT DOCUMENTS 4,849,952 7/1989 Shiho .................................. 360/114

FOREIGN PATENT DOCUMENTS

3325648A1 1/1984 Fed. Rep. of Germany .
59-38951 3/1984 Japan ..................................... 369/13
59-54003 3/1984 Japan ..................................... 369/13
59-119507 7/1984 Japan ..................................... 369/13
61-292250 12/1986 Japan ..................................... 369/13
61-294648 12/1986 Japan ..................................... 369/13
62-8345 1/1987 Japan ..................................... 369/13
62-14352 1/1987 Japan .................................. 360/114
62-149058 7/1987 Japan .................................. 360/114

*Primary Examiner*—Stuart S. Levy
*Assistant Examiner*—Hoa Nguyen
*Attorney, Agent, or Firm*—Finnegan, Henderson, Farabow, Garrett, and Dunner

[57] ABSTRACT

In a magnetic field generating apparatus, a coil is wound around a core and a magnetic extending section is extended from the core member. The magnetic extending section is formed into a taper form and has a magnetic field applying surface. A magnetic flux generated in the core by supplying a current to the coil is led into the extending section and emerged from the magnetic field applying surface to an opto-magnetic memory. The magnetic flux penetrates the opto-magnetic memory and is returned to the core through a yoke.

5 Claims, 13 Drawing Sheets

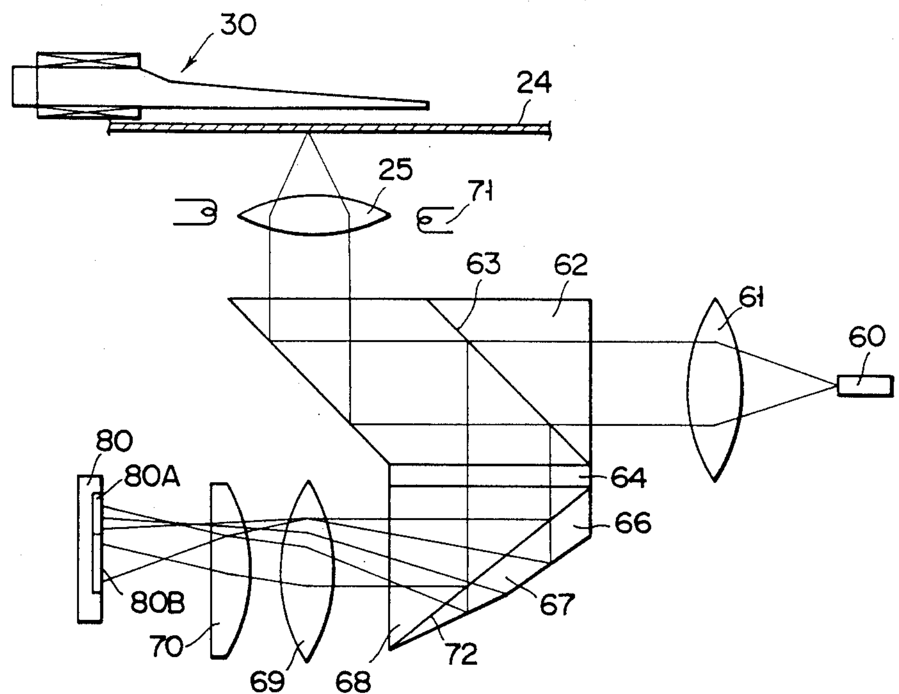
F I G. 7

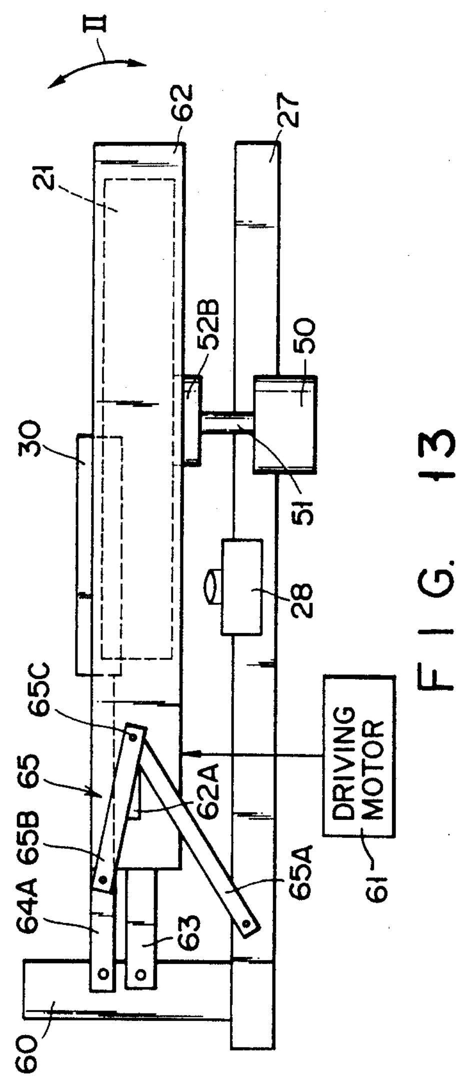
F I G. 13

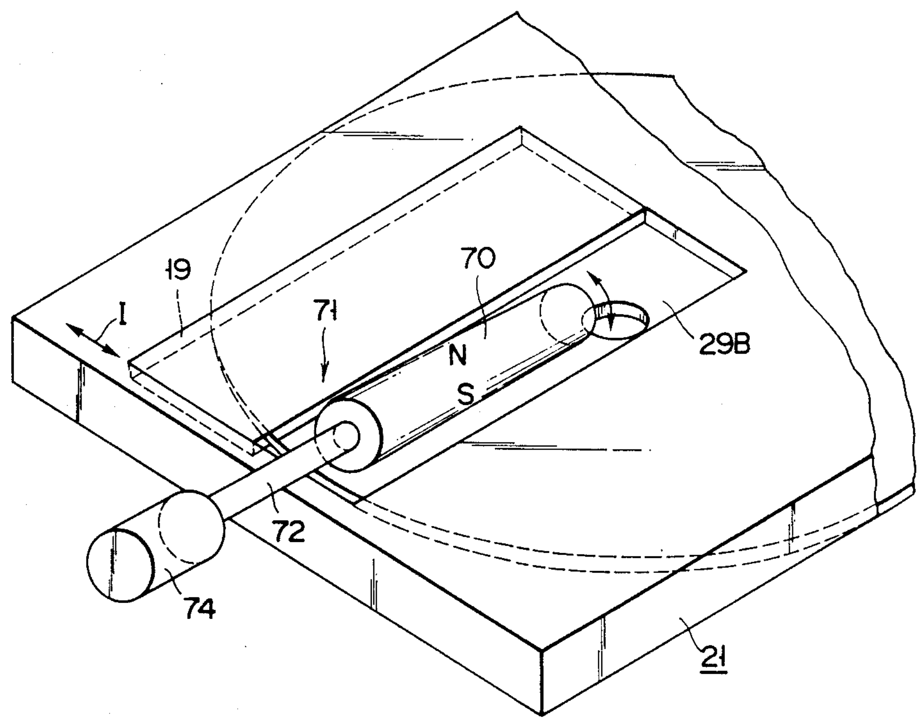
F I G. 14
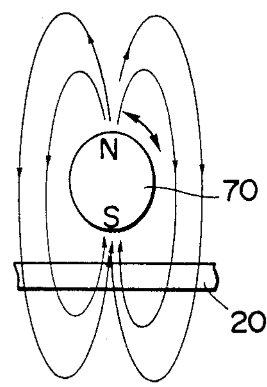
F I G. 15

SYSTEM FOR APPLYING MAGNETIC FIELD TO OPTO-MAGNETIC MEMORY

BACKGROUND OF THE INVENTION

1. Field of the Invention

This invention relates to improvements in an opto-magnetic retrieving system, in which data is recorded in and erased from an opto-magnetic memory with a laser beam while a magnetic field is applied to the memory, and also to a magnetic field generator assembled in the opto-magnetic retrieving system for generating a magnetic field.

2. Description of the Related Art

A data retrieving system utilizing an opto-magnetic retrieving method, there are external memories of computers, rewritable video disk systems and image file systems, DAD type compact disk systems capable of reproduction and recording and rewritable high density recording magnetic card system, these systems being recently developed. In such an opto-magnetic data retrieving system, a static magnetic field is applied perpendicularly to the recording surface of an opto-magnetic memory, i.e., a data recording medium, and a convergent laser beam is projected on the surface of a recording film of the data recording medium for heating the surface up to a temperature exceeding the curie point or a temperature, at which the coercive force is less than the external magnetic field to cause inversion of magnetic moments of domains in that area, thus effecting the recording or erasing of data. As a method of applying a magnetic field to the recording medium in such a system, there are a method, a magnetic field is applied locally only in the neighborhood of an area, which is illuminated by a convergent laser beam to form a beam spot, and an another method, in which a magnetic field is applied continuously over the entire region capable of illumination by the convergent laser beam, e.g., a region along the radius of opto-magnetic disk, on which the convergent laser beam can be shifted for accessing data.

In the prior art magnetic field generator adopting the method of locally applying magnetic field, an electromagnetic coil is wound around a core portion extending into a yoke as box-like magnetic flux returning section. In this magnetic field generator, end surfaces of the core and the yoke oppose the recording film surface of the opto-magnetic memory. When a current is supplied to the electromagnetic coil, a magnetic flux applied from the end surface of the core is spread as it penetrates the recording film surface of the opto-magnetic memory and returns to the end surface of the yoke surrounding the end surface of the core. Thus, a magnetic field perpendicular to the recording film surface of the opto-magnetic memory, is applied locally to the recording film surface. Where the local magnetic field application method is adopted, the magnetic field generator itself is formed to have a small size with the longitudinal dimension of the core and the yoke end surfaces of the magnetic field generator set to the length of a local area, to which magnetic field is to be applied.

On the other hand, in a prior art magnetic field generator adopting the another, in which a magnetic field is applied over the entire data retrieval area of the opto-magnetic memory, an electromagnetic coil is wound around an elongated core portion, which extends into and substantially parallel to a yoke having a U-shaped cross sectional profile and serving as magnetic flux returning path. In this magnetic field generator, parallel end surfaces of the core and the yoke oppose the recording film surface of the opto-magnetic memory. When a current is supplied to the electromagnetic coil, a magnetic flux supplied from the end surface of the core penetrates the recording film surface of the opto-magnetic memory to return to the end surface of the yoke. Likewise, a magnetic field perpendicular to the recording surface of the opto-magnetic memory, is applied to the entire area of the recording film surface capable of laser beam illumination, i.e., area capable of data retrieval. When the method of applying a magnetic field to the entire area is adopted, the core and the yoke end surfaces of the magnetic field generator have substantially equal width and a substantially equal length, and the longitudinal dimension of the core and the yoke end surfaces is set to be greater than the length of the opto-magnetic recording surface of the opto-magnetic memory, so that the magnetic field generator itself has a comparatively large size.

In the prior art magnetic field generator, which adopts the local magnetic field application method, a magnetic field is applied locally. Therefore, the magnetic field generator itself has to be moved with the movement of the laser bean:. Thus, the magnetic field generating system requires a complicated moving mechanism. On the other hand, the prior art magnetic field generator, which adopts the method of applying a magnetic field to the entire area, although it does not require movement of the magnetic field generator, has the following problems.

(1) The power consumption is high. If a magnetic field of high intensity has to be applied to the data recording medium, a high magnetomotive force has to be generated from the electromagnetic coil. This magnetomotive force is determined by the product $N \times I$ of the total turns number N of the electromagnetic coil and current I supplied to the coil. The power P consumed in the coil is $$P = I \times R^2$$

where R is the resistance of the coil. In the magnetic field generator, the longitudinal dimension of the core portion is determined in correspondence to the length of the recording surface of the opto-magnetic recording medium, and hence the outer periphery thereof has a comparatively great length. This means that the conductor wire of the N-turn electromagnetic coil wound around the elongated core portion has an extremely great total length. Therefore, the resistance R of the coil is correspondingly high, and the necessary power consumption is also correspondingly high. If the size of the conductor wire is increased to reduce the resistance R of the electromagnetic coil, the turns number N is reduced with a predetermined size of the electromagnetic coil accommodation space. Further, if a predetermined magnetomotive force is to be obtained with reduced turns number N, a large current has to be supplied to the coil. This again means a power consumption increase.

(2) Heat is greatly generated. When the power consumption is high, the heat generation is increased as noted above. The electromagnetic coil, which is a heat-generating part of the magnetic field generator, and the core and yoke, to which the heat from the coil is transmitted, are disposed sufficiently closely to and oppose the opto-magnetic recording medium. Therefore, it is liable that heat transmitted from the magnetic field generator to the opto-magnetic recording medium causes thermal deformation of the opto-magnetic memory or loss of recorded data.

(3) The size of the magnetic field generator is increased; particularly, the height of the magnetic field generator in the direction perpendicular to the recording surface is increased. If the flux density on the recording surface is to be increased, it is necessary to sufficiently reduce the width of the core and sufficiently increase the height of the core and yoke so as to arrange the turns of the coil in a direction perpendicular to the recording surface. With such a structure, the height of the magnetic field generator is inevitably increased. Where a magnetic field generator having a large height is disposed above the opto-magnetic recording medium, the data retrieving system itself inevitably has a large size. This means a restriction imposed on the design of the system.

The problems of size increase of the data retrieving system are presented not only in the magnetic field generator utilizing an electromagnet but also in the magnetic field generators utilizing permanent magnets as disclosed in Japanese Patent Laid Open Disclosures Nos. 59-54,003, 62-8,345 and 62-14,352. That is, it is difficult to reduce the size of these magnetic field generators.

SUMMARY OF THE INVENTION

An object of the invention is to provide a magnetic field generator for a data retrieving system, which permits reduction of the size of the data retrieving system.

Another object of the invention is to provide a small size data retrieving system provided with a mechanism for lifting and lowering a magnetic field generator.

According to the invention, there is provided an apparatus for applying a magnetic field to an opto-magnetic recording medium, comprising:

a magnetic core member;

means wound around said core member, for generating a magnetic flux in said core;

a magnetic extending member extending from said core member and having a surface opposing the opto-magnetic recording medium, the magnetic field being applied from said opposing surface to said opto-magnetic recording medium; and a magnetic yoke member magnetically coupled to said core member, so that a magnetic field passing through said opto-magnetic recording medium is returned to said yoke member.

According to the invention there is also provided an apparatus for applying a magnetic field to an opto-magnetic recording medium, comprising:

a magnetic core member;

means wound around said core block, for generating a magnetic flux in said core member;

a magnetic extending member extending from said core member such as !o form an inverted T-shaped profile together with said core member and having one surface opposing an opto-magnetic recording medium; mean for applying the magnetic field from said one surface onto said opto-magnetic recording medium; and a magnetic yoke member magnetically coupled to said core member so that a magnetic field passing through said opto-magnetic recording medium is returned to said yoke member.

According to the invention, there is further provided an apparatus for reproducing information from an opto-magnetic recording memory having a first surface to which a light beam is applied and a second surface which is opposed to the first surface, said apparatus comprising:

means for generating a magnetic field to be applied to the second surface of the opto-magnetic recording memory, the generating means including a surface having a pole facing the second surface of the opto-magnetic recording memory;

means for holding the opto-magnetic recording memory; and means for locating the generating means to oppose the pole to the second surface of the opto-magnetic recording memory when the holding means holds the opto-magnetic recording memory.

BRIEF DESCRIPTION OF THE DRAWINGS

FIG. 7 is a schematic view showing an optical system of an optical head shown in FIG. 2;

FIGS. 12 and 13 are schematic side views showing a mechanism for lifting and lowering the magnetic field generator of FIGS. 8 to 10; and FIGS. 14 and 1 5 are a perspective view and a sectional view, respectively, showing a different magnetic field generator lifted and lowered by the lift mechanism shown in FIGS. 12 and 13.

DETAILED DESCRIPTION OF THE PREFERRED EMBODIMENT

Figure 1:
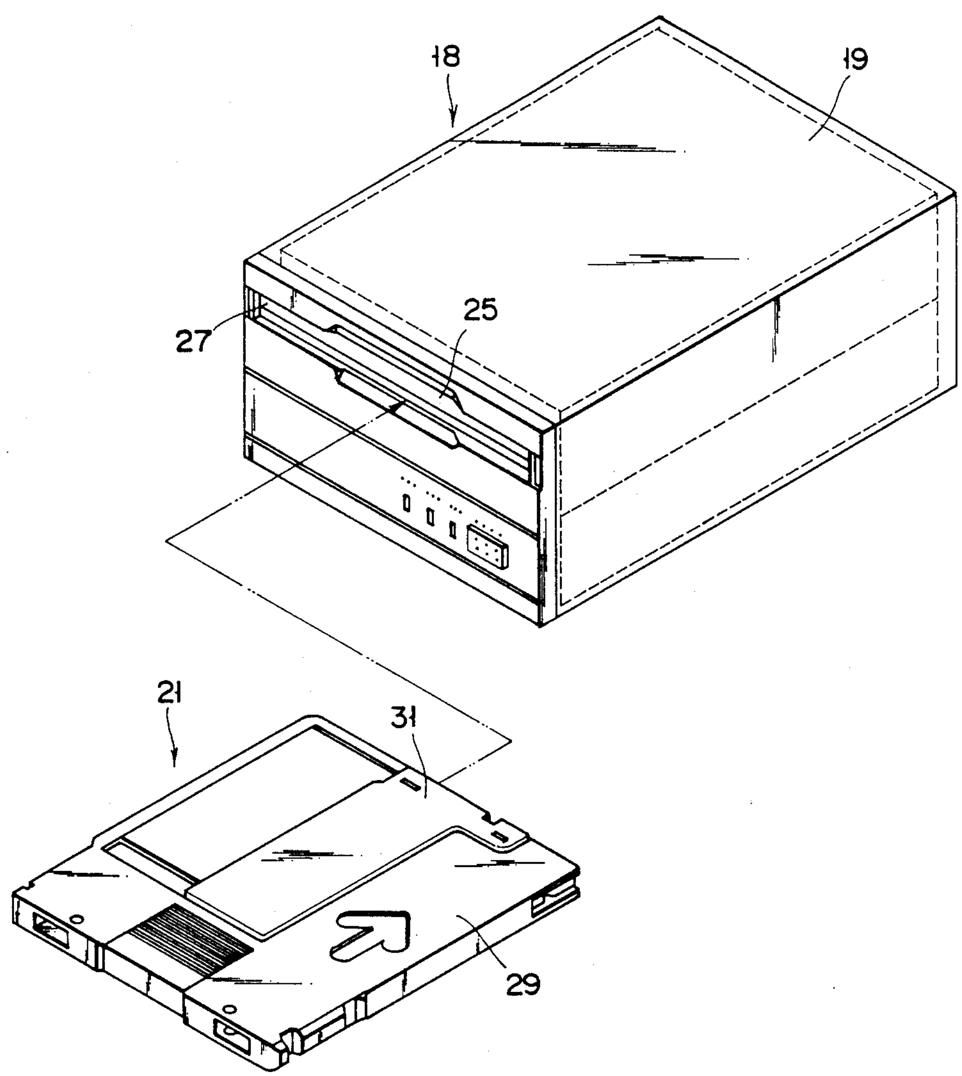
FIG. 1 is a schematic perspective view showing an opto-magnetic data retrieving system and a cassette to be mounted therein in an embodiment of the invention.
Figure 2:
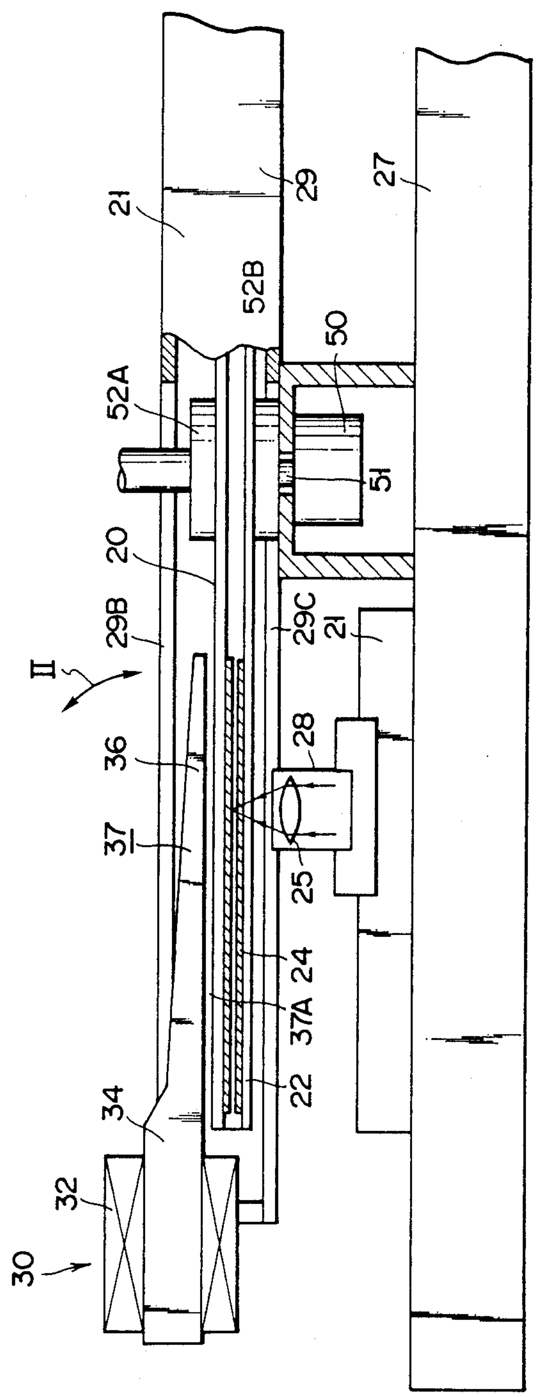
FIG. 2 is a schematic sectional view showing the opto-magnetic data retrieving system in the same embodiment.

FIG. 1 is a perspective view showing data recording retrieving system 18 and cartridge 21 accommodating an opto-magnetic recording system, i.e., an opto-magnetic memory, according to an embodiment of the invention. The data recording/reproducing system 18, as shown in FIG. 1, comprises box-like case 19. The front of case 19 is provided with inlet 25, through which cartridge 21 is inserted. Inlet 25 is provided with inlet shutter 27 for opening and closing it. Cartridge 21, as shown in FIG. 1, comprises thin rectangular case 29. Case 29, as shown in FIG. 2, has upper and lower plates formed with respective upper and lower windows 29A and 29C. When cartridge 21 is mounted in data recording/reproducing system 18, upper and lower windows 29B and 29C extend in the radial direction of optical disk 20. Case 29 is provided with shutter 31 which is slidable in the direction of arrow I.

Figure 3:
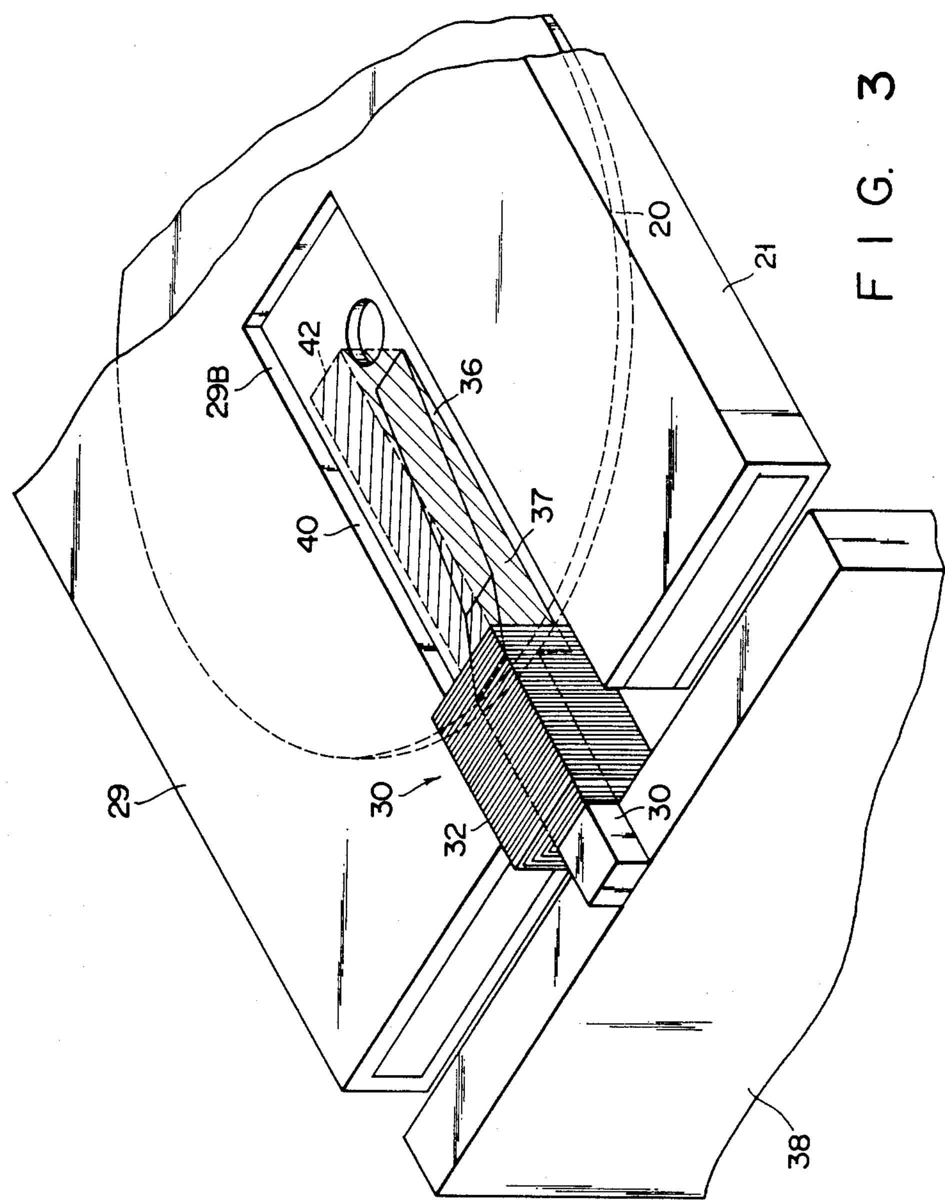
FIG. 3 is a schematic perspective view showing a magnetic field generator and the cassette in the same embodiment.

In this data recording/reproducing system 18, cartridge 21, when inserted into the system through inlet 25, is loaded in the system by a loading mechanism (not shown), as shown by two-dot-and-one-dash line in FIG. 3.

The opto-magnetic recording medium, i.e., opto-magnetic memory 20, as shown in FIG. 2, which has a structure consisting of pair of transparent base plate 22 secured to each other and opposing each other via an intervening air gap. Each of transparent bases 22 is provided with opto-magnetic recording film 24 formed on the inner surface. Opto-magnetic recording film 24 is usually formed with a tracking guide (not shown). The opto-magnetic recording medium is usually disk-like in form as it is called opto-magnetic disk, but this is not limitative, and it may in various other forms as well, e.g., card-like form. Further, opto-magnetic disk 20, which is accommodated for protection in cassette 21, is inserted with cassette 21 from inlet 25 of the data recording/reproducing system by a loading mechanism (not shown) as shown in FIGS. 1 and 2, when it is loaded in the system. At the time of ejection, it is ejected with cassette 21 from inlet 25 of the data recording/reproducing system. When cassette 21 is loaded in the data recording/reproducing system, as shown in FIGS. 2 and 3, windows 29B and 29C of cassette 21 are opened, opto-magnetic disk 20 is clamped between lower stamper 52B, which is coupled to motor 50 via spindle 51, and upper stamper 52A, which is lowered from above opto-magnetic disk 20, and objective lens 25 of opto-magnetic head 28 is held such that it can converge a laser beam incident on it through lower window 29C disposed beneath the opto-magnetic disk. Further, when cassette 21 is loaded in the data recording/reproducing system, magnetic flux supplying section 37 of magnetic field generator 30 is disposed inside upper window 29B such that magnetic flux supplying surface 37A opposes opto-magnetic disk 20 to be ready for retrieving or erasing of data with respect to opto-magnetic disk 20. At the time of the ejection of cassette 21 from the data recording/reproducing system, upper stamper 52A is raised. and magnetic flux supplying section 37 of magnetic field generator 30 is retreated to the outside of upper window 26B, while magnetic field generator 30 is moved by a moving mechanism, that is, it is moved together with cassette 21 upwardly from lower stamper 52B In this state, cassette 21 is ejected. Magnetic field generator 30 has such a structure that it can be separated by a separating mechanism (not shown) so that it will not interfere with the operations of loading and ejecting of opto-magnetic disk 20.

Figure 6:
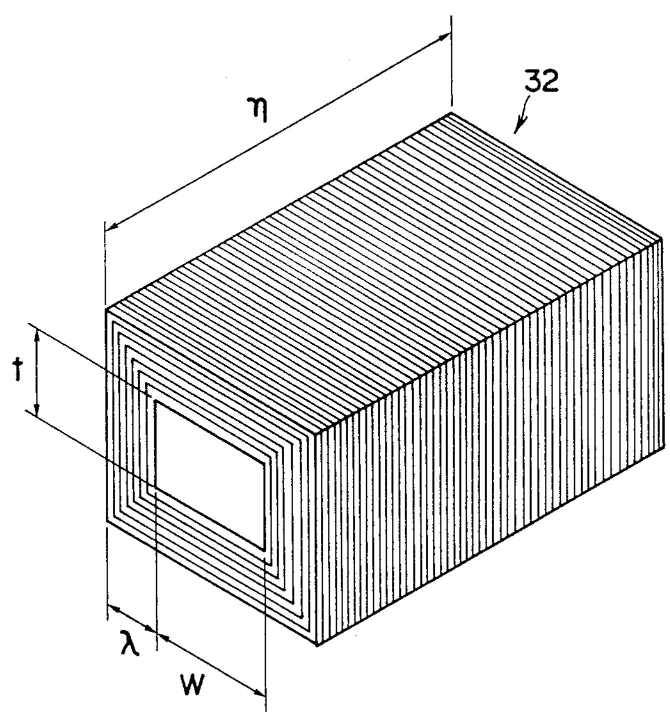
FIG. 6 is a perspective view showing an electromagnetic coil shown in FIG. 3.

Magnetic field generator 30, as shown in FIG. 6, has angular or plate-like core around which electromagnetic coil 32 is wound and extending section 36 of a magnetic material. Extending section is integral with the core and serves as magnetic flux supplying section 37 for supplying a magnetic field to opto-magnetic disk 20. The magnetic flux supplying section 37 is formed into a tapering shape, i.e., its thickness is reduced progressively as one goes toward its free end opposite the core. Electromagnetic coil 32 has a length dimension along a long axis of core portion 34 greater than the thickness of its coil layer. One end of magnetic flux supplying section 37 can be removably supported on the top of a support serving as yoke section 38, to which the magnetic flux produced from the extension returns and penetrating disk 20 is returned. In the operations of loading and ejecting opto-magnetic disk 20, magnetic flux supplying section 37 is separated upwardly from yoke section 38.

In a state ready for erasing or recording data, objective lens 25 opposes the surface of opto-magnetic recording film 24 of opto-magnetic disk 20, and extending section 36 extends beyond a range corresponding to an area of opto-magnetic recording film 24, which can be illuminated by the laser beam converged by objective lens 25 as objective lens 25 is moved along guide mechanism 21. Extending section 36 has the flat lower surface opposing the opto-magnetic recording film area capable of laser beam illumination.

Core 34 has a sectional area which is set to be smaller than the area of magnetic flux applying surface 37A of magnetic flux supplying section 37. Besides, the sectional area of core portion 34 is set to be sufficiently small so that nearly saturation flux density Bs is obtained at that section during operation, so that the length dimension of the outer periphery of core portion 34 is correspondingly small. Consequently, the length of the wire of electromagnetic coil 32 required for one turn is reduced to reduce the resistance of electromagnetic coil 32 as a whole. The area of the section of magnetic flux supplying section 37 in a plane normal to the longitudinal direction of the section. Likewise is set to be sufficiently small so that nearly saturation flux density Bs is obtained at that section during operation so that the cuter surface area is correspondingly small. The magnetic flux passing through a portion of magnetic flux supplying section 37 close to core portion 34 is equal to the sum of magnetic fluxes provided from the surfaces of portions of section 37 closer to core portion 34. This means that magnetic flux supplying section 37 has such shape that its sectional area increases as one goes toward core portion 34.

Optical head 28, as shown in FIG. 2, is held such that it is movable along guide mechanism 21 extending on base 27 in the radial direction of opto-magnetic disk 20.

In the magnetic field generator having the above construction, when electromagnetic coil 32 is energized by current supplied to it, a magnetic flux is supplied from core 34 through coupling or yoke section 38 to extending section 36 to be provided from magnetic flux provision surface 37A, i.e., lower surface of extending section 36, toward the area of opto-magnetic recording film 24. Thus, opto-magnetic recording film 24 is exposed to magnetic flux perpendicular to its plane. The magnetic flux penetrating opto-magnetic recording film 24 passes through a space to enter yoke section 38 so that it is returned to core 34 which is magnetically and mechanically coupled to the yoke.

In the above embodiment, longitudinal axis of core 34 and lower surface of magnetic flux supplying section 37 may be parallel lower surfaces and a step or gap is provided therebetween so that the flat lower surface of magnetic flux supplying section 37 is closer to the lower surface of electromagnetic coil 32. With this arrangement, it is possible to reduce the thickness of the overall structure including core portion 34 and magnetic flux supplying section 37.

In the above embodiment, magnetic field generator 30 is constructed such that magnetic flux supplying section 37 is separable from yoke section 38. This structure, however, is by no means limitative; for instance, magnetic flux provision section 37 may be secured to yoke section 38 and have a separable portion. As a further alternative, core portion 34 and magnetic flux supplying section 37 may be coupled separably. As a still further alternative, the yoke section may have a separable portion. Further, for generation of a magnetic flux perpendicular to opto-magnetic recording film 24, magnetic flux supplying section 37 suitably has a plate-like shape having a flat lower surface as illustrated. This shape, however, is also not limitative; for instance, it is possible to use an angular or circular magnetic flux supplying section.

Magnetic flux supplying section 37 in magnetic field generator 30 has a tapering shape such that its thickness reduces as one goes toward its free end, so that its entire surface area is correspondingly reduced.

The data recording/reproducing system as shown in FIG. 1 includes an optical system as shown in FIG. 7, the optical system being assembled in optical head 28. In this optical system, a laser beam produced from semiconductor laser 60 is collimated by collimator lens 61 before being incident on beam splitter 62. The laser beam from beam splitter is focused on opto-magnetic recording film 24 by objective lens 25, which is supported by voice coil 71 such that it is movable in its axial direction In a reproducing mode, magnetic field generator 30 is held inoperative, and a laser beam for reproduction is reflected from a surface region of opto-magnetic recording film 24 on which information data is recorded as inverted domains with its polarization plane rotated in the surface region. In a recording mode, magnetic field generator 30 is held operative, and a recording laser beam having a comparatively high intensity is led to be incident on opto-magnetic recording medium with a magnetic field provided thereto from magnetic field generator 30, so that magnetic domains of opto-magnetic recording film 24 in a region thereof for recording are inverted according to recording data to effect recording thereof. In an erasing mode, magnetic field generator 30 is held operative, and an erasing laser beam which has a lower intensity than the recording laser beam is focused on opto-magnetic recording film 24 to which a magnetic field is applied, thus inverting again the magnetic domains in the erasing region of opto-magnetic recording film 24. The data to be erased is thus erased. In the recording and erasing modes, like the reproducing mode, the laser beam reflected from opto-magnetic recording medium 24 is led through objective lens 25 to polarized polarizing beam splitter 62. The laser beam reflected from semi-transparent mirror surface 63 of beam splitter 62 is transmitted through one-half wavelength plate 64 to be incident on prism 66 for separating the beam it into polarized components. As the laser beam is transmitted through one-half wavelength plate 64, the polarization plane of the laser beam is rotated by 45 degrees to change the ratio of the polarized components. Polarization prism 66 consists of first orthogonal prism 68 and second prism 67 joined thereto. Polarization plane 72 is defined in the interface, i.e., junction, between the two prisms. On the back surface of second prism 67, two inclined reflecting surfaces 67A and 67B contiguous to each other via an interface are formed. The interface between reflecting surfaces 67A and 67B extends in the direction of extension of a tracking guide or the direction of extension of an image of the tracking guide. Thus, the P-polarized component of the laser beam incident on prism 66 is reflected by polarizing surface 72, is converged by projection lens 69 and then given astigmatism by cylindrical lens 70 before being incident on first optical detection area 80B of optical detector 80. The S-polarized component of the laser beam incident on prism 66 is transmitted through polarization surface 72 and reflected from reflecting surface 67A and 67B. When the S-polarized component of the laser beam is reflected by reflecting surfaces 67A and 67B, it is split into first and second laser beams. The first and second S-polarized laser beams are converged by projection lens 69 and then given astigmatism by cylindrical lens 70 before being incident on second optical detection area 80B of optical detector 80. Signals from first and second optical detection areas 80A and 80B are both integrated, and the two integrals are compared to obtain a reproduced signal. The signal from first optical detection area 80A is processed to obtain a focusing signal, and the signal from second optical detection area 80B is processed to obtain a tracking signal. The optical system utilizes, as focus detection method for obtaining the focusing signal, a knife edge method as disclosed in U.S. Pat. No. 4,517,444, Ando' issued on May 14, 1985, or an astigmatism method as disclosed in U.S. Pat. No. 4,023,033,Bricot et al, issued on May 10, 1977. Further, the system utilizes a push-pull method as disclosed in U.S. Pat. No. 4,517,444 as tracking guide detection method for obtaining the tracking signal. Objective lens 25 is held in the in-focus state with voice coil 71 driven according to the focusing signal. Also, according to the tracking signal, optical head 28 is moved along guide mechanism 21, so that a convergent laser beam from objective lens 25 is accurately directed toward the tracking guide to maintain a state ready for retrieving or erasing of data.

Figure 5:
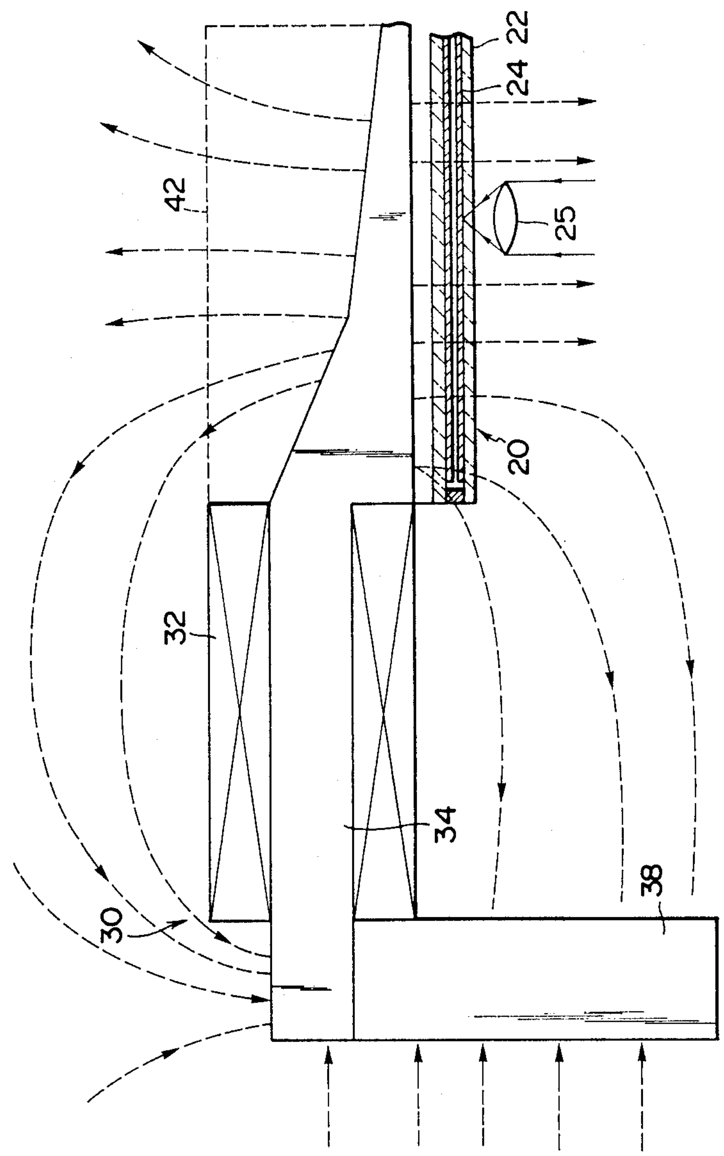
FIG. 5 is a sectional view showing the magnetic field generator of FIG. 3.
Figure 8:
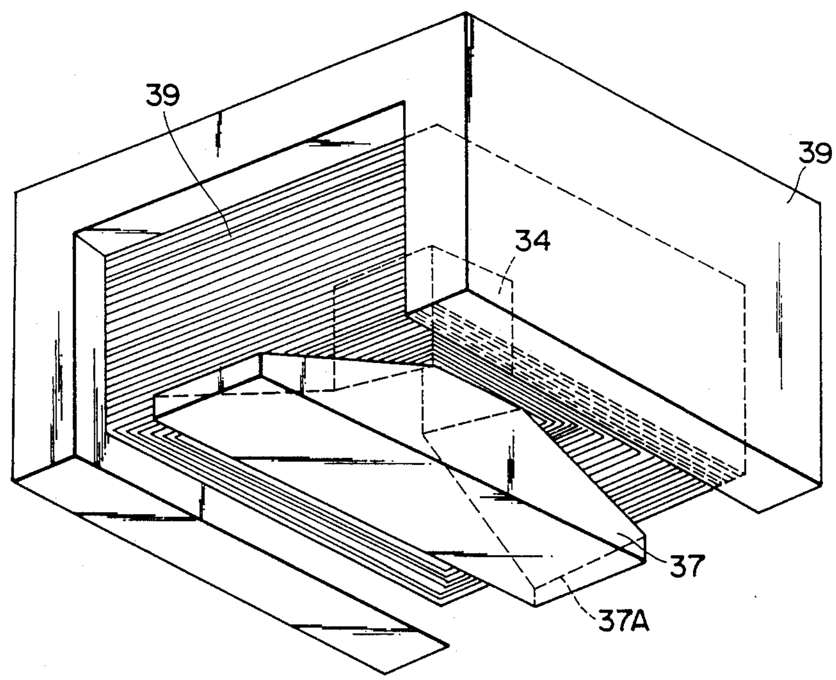
FIGS. 8 to 10 are schematic perspective views showing a magnetic field generator in a different embodiment of the invention.
Figure 9:
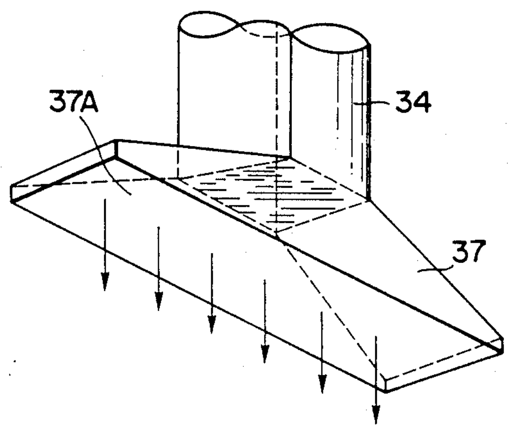

FIG. 5 shows magnetic field generator 30 which may be used in stead of the magnetic field generator shown in FIG. 8. Magnetic field generator 10 of FIG. 8 includes column shape core 34, on which electromagnetic coil 32 like that shown in FIG. 5, magnetic flux supplying section 37 having magnetic flux applying surface 37A extending perpendicular to the direction of extension of core portion 34 as shown in FIG. 9 and U-shaped yoke section 39 having an inner surface, to which the other end of core portion 34 is coupled, the magnetic flux from the magnetic flux applying surface 37A being returned to yoke section 39. Core 34 and magnetic flux supplying section 37 are arranged or combined into a T-shaped form. A section of core 34 parallel to magnetic field applying surface 37A is set to be smaller than magnetic field supplying surface 37. Magnetic field supplying section 37 has a tapering shape with its thickness reducing as one goes from its center portion coupled to core portion 34 to its free end along its long axis. Magnetic field supplying section 37 which is to oppose an areas of opto-magnetic disk 20 has a length dimension substantially corresponding to the radius of opto-magnetic disk 20. More specifically, magnetic flux applying surface 37A extends beyond a range corresponding to the area of opto-magnetic recording film 24 which is capable of being illuminated by the laser beam converged by objective lens 25. In the mode of retrieving or erasing data, magnetic flux supplying surface 37A, i.e., the flat lower surface of section 37, opposes opto-magnetic recording film area capable of laser beam illumination. Core 34 which extends from the inner surface of U-shaped yoke section 39, has a sectional area set to be smaller than the area of magnetic flux applying surface 37A of magnetic flux supplying section 37. The sectional area of core 34 is set to be sufficiently small so that nearly saturation flux density Bs can be obtained at that section during operation, so that the length of the outer periphery of core 34 is correspondingly small. Consequently, the length of wire of electromagnetic coil 32 required for one turn, and hence the resistance of entire electromagnetic coil 32, is reduced. The area of a section of magnetic flux supplying section 37 perpendicular to the longitudinal direction thereof, likewise is set to be sufficiently small so that nearly saturation flux density Bs can be obtained at that section during operation. The magnetic flux passing through a portion of magnetic flux supplying section 37 close to core portion 34, is equal to the sum of magnetic fluxes provided from portions closer to core portion 34. In other words, magnetic flux supplying section 37 has such a shape that its sectional area increases as one goes toward core portion 34. In order to reduce the total magnetic flux passing through core portion 34 and provide a uniform flux distribution in the neighborhood of magnetic flux applying surface 37A in the longitudinal direction thereof, a central portion of magnetic flux supplying section 37 is coupled to core portion 34.

Figure 10:
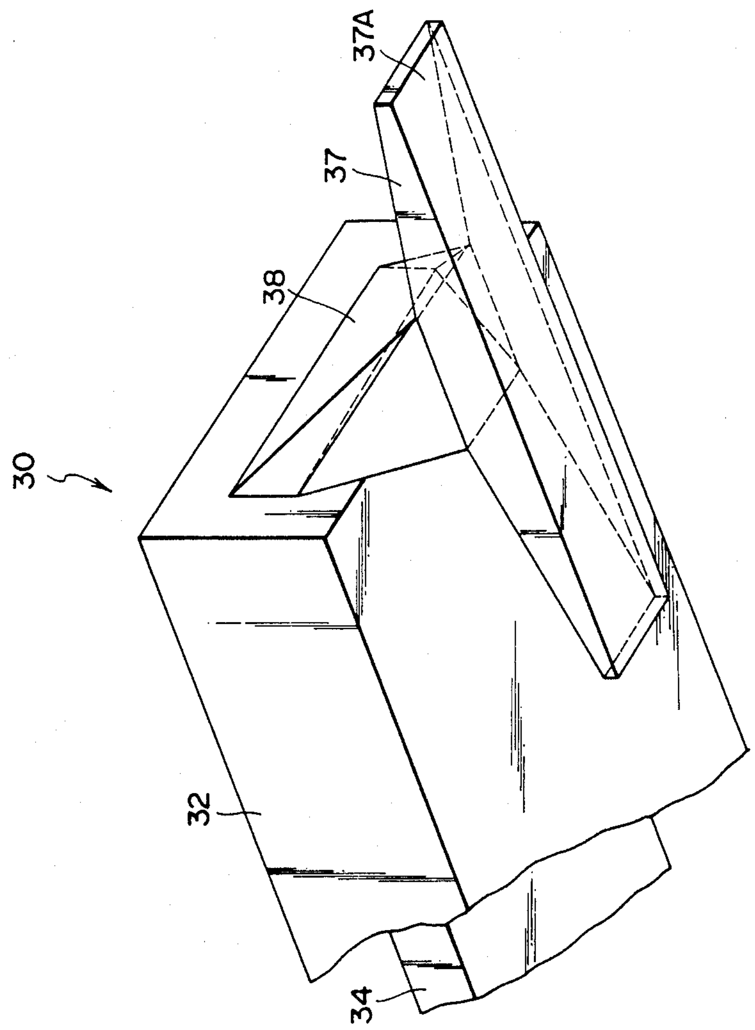

FIG. 10 shows a further example of magnetic field generator 30. Magnetic field generator 30 of FIG. 10 includes column or plate-like core 34 with electromagnetic coil 32 wound therearound as shown in FIG. 6, magnetic flux supplying section 37 having magnetic flux applying surface 37A extending substantially parallel to the direction of extension of core 34, conical coupling section 37B extending substantially perpendicular to the direction of extension of core 34 and coupling one end of core 34 and the top surface of a central portion of magnetic flux supplying section 37 to provide a gap or step between core 34 and magnetic flux applying section 37 and yoke section 39 extending from the other end of core 34, a magnetic flux from magnetic flux applying surface 37A returning to yoke section 39. Magnetic flux supplying section 37 has a tapering shape with the thickness thereof reducing as one goes from the central portion to the opposite ends, and it has a length substantially corresponding to the radius of opto-magnetic disk 20. Magnetic flux applying surface 37A extends beyond a range corresponding to the area of opto-magnetic recording film 24 capable of being illuminated by a laser beam converged by objective lens 25. When retrieving or erasing data, magnetic flux applying surface 37A, i.e., the flat lower surface, opposes the opto-magnetic recording film 24 capable of laser beam illumination. Core 34 which extends from yoke 39 has a comparatively large length for it is coupled by coupling portion 38 to a substantially central portion of magnetic flux supplying section 37. Electromagnetic coil 32 has a correspondingly great length, so that it is thin and elongate in shape.

In magnetic field generator 30, magnetic flux supplying section 37 has a tapering shape with the its thickness reducing as one goes from its central portion to its opposite ends so that its surface area is reduced. Thus, leakage flux from the surface of magnetic flux supplying section 37 is reduced for effective utilization of the generated magnetic flux. The section of magnetic flux supplying section 37 is largest in its central portion, to which coupling section 37B is coupled and magnetic flux is led, and it reduces as one goes from the central portion to the opposite ends. In other words, the surface area, and hence leakage flux, reduces as one goes toward the opposite ends, and also the flux led through magnetic flux supplying section 37 reduces as one goes toward the opposite ends. Thus, the magnetic flux provided from the magnetic field applying surface can be held uniform, that is, a uniform magnetic flux can be provided to opto-magnetic recording film 24. Further, since electromagnetic coil 32 is thin and elongate in shape as shown in FIG. 6, it is possible to generate higher electromotive force with lower power consumed. More specifically, the electromotive force of magnetic flux generated from magnetic field generator 30 is determined by the product of the turns number of electromagnetic coil 32 and current supplied thereto, but the resistance of electromagnetic force 32 is proportional to the length of wire required for one turn, while the power consumed in electromagnetic coil 32 is proportional to the overall resistance. Thus, the turns number for a predetermined resistance can be increased by forming electromagnetic coil 32 to be thinner and more elongate.

Figure 11:
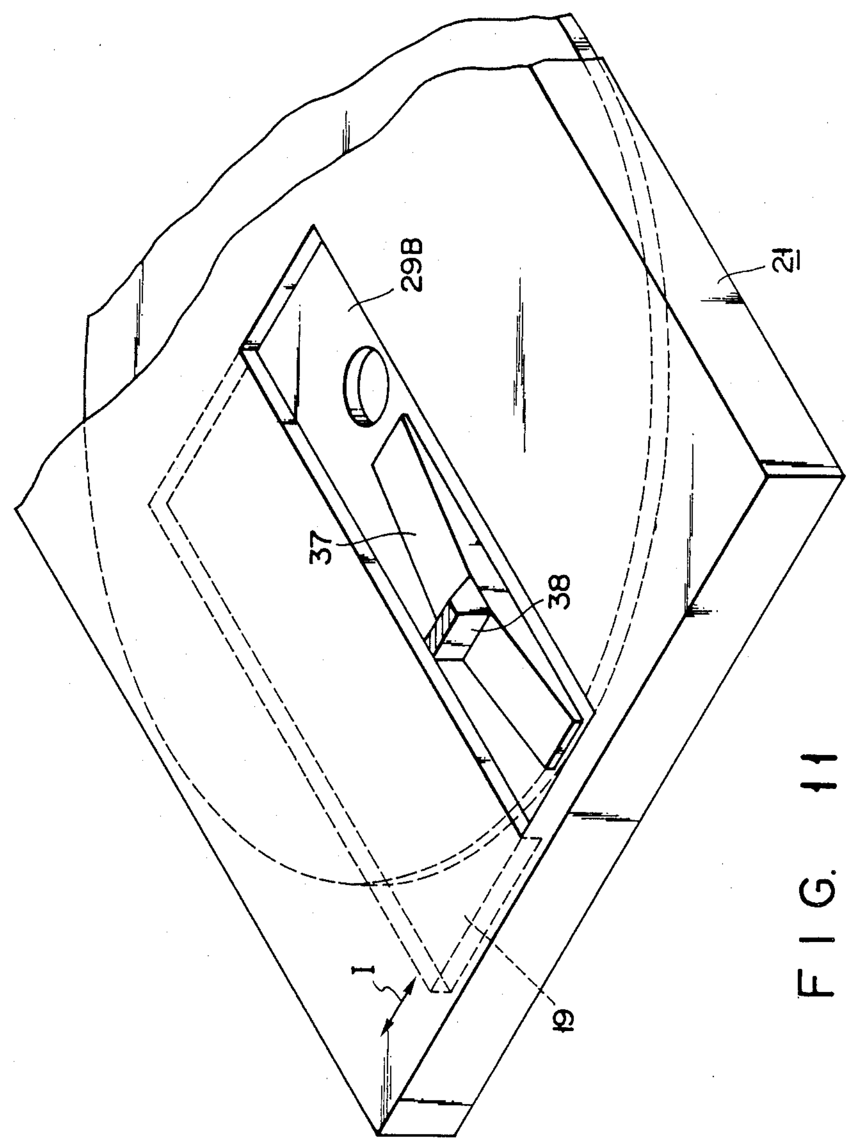
FIG. 11 is a schematic perspective view showing the magnetic field generator of FIGS. 8 to 10 disposed on a cassette.

The magnetic field generator shown in FIGS. 8 and 9 or that shown in FIG. 10 may be arranged as shown in FIG. 11, so that it is possible to apply a magnetic field to the opto-magnetic memory equally effectively to the case of FIG. 5 and obtain equal effects.

Now, the functions and operational principles of the magnetic field generator will be described with reference to FIGS. 5 and 6. Denoting the turns number of electromagnetic coil 32 by N and current supplied to electromagnetic coil 32 by I, an electromotive force Vm of $Vm = IN$ is generated in magnetic flux supplying section 37 by electromagnetic coil 32. The magnetic force lines of the flux provided from the surface of magnetic flux supplying section 37 reaches a space which is considerably remote from magnetic flux supplying section 37. The magnetic force lines provided into space proceed yoke 38 as magnetic returning path such as to draw a closed loop and returns through yoke 38 to magnetic flux supplying section 37. In such a magnetic field distribution, magnetic force lines are produced in the neighborhood of magnetic field applying surface 37A of magnetic flux supplying section 37 such that they are perpendicular to the flat lower surface and provided perpendicularly to opto-magnetic recording film 24 of opto-magnetic disk 20. As noted above, in opto-magnetic disk 20, opto-magnetic recording film 24 is formed on transparent base 22, and magnetic field applying surface 37A of magnetic flux provision section 37 is spaced apart a slight distance from opto-magnetic recording film 24. This distance is usually as small as 2.5 to 4.0 mm. Besides, magnetic flux applying surface 37A has a comparatively large width, e.g., 3 mm or above, and an appropriate length greater than the length of the area of opto-magnetic recording film 24, e.g., 20 mm or above. The magnetic flux thus can be provided effectively perpendicularly to opto-magnetic recording film 24. Thus, magnetic force lines having a uniform intensity are applied to the entire opto-magnetic recording film area capable of laser beam illumination. The width of magnetic flux supplying section 37 is determined by taking into considerations the fact that opto-magnetic recording film 24 is subject to vertical motion caused with surface vibration of transparent base 22 produced during rotation of opto-magnetic disk 20. The width of magnetic flux supplying section 37 is set to a value in a range of 2 to 30 mm.

With this width value, no substantial changes in magnetic flux are caused on opto-magnetic recording film 24 with vertical motion thereof and there is no need of unnecessarily increasing the flux passing through magnetic flux supplying provision section 37.

The magnetic potential difference between magnetic flux supplying section 37 and yoke 38, i.e., electromotive force, is determined by Vm=IN. The magnetic potential on the surface of magnetic flux supplying section 37 and yoke 38, on the other hand, is determined as a function of the surface area. Assuming the magnetic reluctance Rm from each of the surfaces of magnetic flux supplying section 37 and yoke 38 to infinity at zero magnetic potential to be $Rm=1/2\mu_0\sqrt{\pi S}$ where S is the surface area (although in the CGS emu unit system: $Rm=1/2\sqrt{\pi S}$ for $\mu_0=1$), the magnetic potential noted above is the higher the smaller is the surface area of magnetic flux supplying section 37. Since the total magnetic flux provided from magnetic flux supplying section 37 and returning from a remote space to yoke 38 is constant, the flux density on extension 36 may be made the higher the smaller is the surface area of magnetic flux supplying section 37.

What is discussed above will no be explained mathematically using a simple model. The surface areas of magnetic flux supplying section 37 and yoke 38 are denoted by Sc and Sy, respectively, and the magnetic reluctances from magnetic flux supplying section 37 and yoke 38 to infinity at zero magnetic potential by Rmc and Rmy, respectively. The magnetic flux provided from magnetic flux supplying section 37 toward yoke 38 is denoted by total, and the flux density on the surface of magnetic flux supplying section 37 by Bc(0). As noted above, the magnetic reluxtances Rmc and Rmy are assumed to be $$Rmc = 1/2\sqrt{\pi Sc} \quad (1)$$

$$Rmy = 1/2\sqrt{\pi Sy} \quad (2)$$

where it is assumed that $$Rm = 1/4\mu_0\pi r_0,$$

$$r_0 = \sqrt{S/4\pi}$$

Total of the magnetic flux $\phi$ is given as $$\begin{aligned} \phi total &= Vm \times (Rmc + Rmy)^{-1} \quad (3) \\ &= 2\sqrt{\pi}\ Vm \times (1/\sqrt{Sc} + 1/\sqrt{Sy})^{-1} \end{aligned}$$

where Vm is the magnetomotive force (Vm=NI).

The magnetic flux density Bc(0) is given as $$\begin{aligned} Bc(0) &= \phi total + Sc \quad (4) \\ &= 2\sqrt{\pi}\cdot Vm\,(1/\sqrt{Sc} + 1/\sqrt{Sr})^{-1}/Sc \end{aligned}$$

Assuming the total area S(d) of the magnetic equipotential surface in space at a distance d from magnetic flux provision section 37 to be $$\begin{aligned} S(d) &= 4\pi(r_0 + d)^2 \\ &= 4\pi(\sqrt{Sc/4\pi} + d)^2 \\ &= (\sqrt{Sc} + \sqrt{4\pi}\cdot d)^2 \end{aligned}$$

the flux density Bc(d) in that space is given as $$\begin{aligned} Bc(d) &= \phi total + S(d) \quad (5) \\ &= 2\sqrt{\pi}\cdot Vm\cdot(-\sqrt{Sc} + \sqrt{4\pi}\cdot d)^{-2} \times (1/\sqrt{Sc} + 1/\sqrt{Sy})^{-1} \\ &= 2\pi\cdot Vm\cdot Sc^{-1}\cdot(1 + \sqrt{4\pi/Sc}\cdot d)^{-2} \times (1/\sqrt{Sc} + 1/\sqrt{Sy})^{-1} \end{aligned}$$

Further, the space field intensity H(d) is obtained as H(0)=B(0( and H(d)=B(d) from $\rho_0=1$. When $Sc>>4\pi d^2$ and $Sy<<Sc$, the equation (5) reduces to $$H(d) = \sqrt{4\pi/Sc} \times Vm \quad (6)$$

Thus, in this case a maximum magnetic field can be supplied to opto-magnetic recording film 24 of opto-magnetic recording medium.

However, H(0) is reduced with reducing Sy. When Sy=Sc and $Sc>>4\pi d^2$, the equation reduces to $$H(d) = \sqrt{\pi/Sc} \times Vm \quad (7)$$

In this case, the magnetic field is only one half of the maximum field given by the equation (6).

As is obvious from the above analysis, it will be understood that Sc<<Sy, i.e., the surface area of magnetic flux supplying section 37 is required to be smaller than the surface area of yoke 38. From the equations (6) and (7), Sc is preferably as small as possible. However, if it is made to be too small, it is smaller than $4\pi d$ Therefore, it can not be made too small.

Now the shape and power consumption of electromagnetic coil 32 will be considered. As shown in FIG. 6, the coil length is denoted by $\eta$, the thickness of coil layer consisting of the winding of a conductor wire by $\mu$, and the width and thickness of core portion 34 by W and t. (The units are in cm.) Further, denoting the maximum permissible temperature increase when current is supplied continuously to electromagnetic coil 32 by $\Delta T$ (in ° C.) and the coefficient of thermal conductivity by $h=250/degree\cdot cm^2$, the maximum power consumption Rmax (in W) is given as $$Pmax=\{2h\Delta T/(1\times 10^4\times\pi)\}\cdot\eta\{W+t+2\lambda\} \quad \ldots (8)$$

(Refer to Yoshiyuki Hirano et al, the Transactions of Institute of Electronics and Communication Engineers of Japan, Vol. J60-C, No. 11, p-684, 1977.)

Further, denoting the coil conductor wire diameter by d (mm), the outer diameter of the wire inclusive of the cover by/xd (mm), the volume resistivity of the coil conductor wire by $\rho(\Omega\cdot cm)$ and the turns number of the coil by N, the resistance Rc of the coil conductor wire is given as $$Rc=\{800\rho N(W+t+2\lambda)\}/(\pi d^2) \quad \ldots (9)$$

From the equations (8) and (9), the maximum permissible current Imax of electromagnetic coil 32 is given as $$Imax = \{1/(2\times 10^4)\} \times \sqrt{h\Delta T/\rho}\cdot(\kappa d^2/\sqrt{\lambda}) \quad (10)$$

and the maximum electromagnetic force Vm is given as $$\max Vm = NI\max = (1/200) \times (\sqrt{h\Delta T/\rho} \cdot \eta \times \lambda/\kappa) \tag{11}$$

where $N8(kd)^2/100 = \lambda\eta$.

A method of obtaining high magnetomotive force with low power consumption will not be considered from the equations (8) and (11).

It will be understood from the equation (11) that the maximum magnetomotive force maxVm is independent of the outer size dimensions (W, t) of core portion 34. A first method of suppressing heat by reducing power consumption is to reduce the value of (W+t) in the equation (8). However, it is necessary that the saturation flux density Bs of the material of core portion 34 is $WtBs \geqq \phi$. Therefore, it is necessary to suppress power consumption by minimizing $\phi$. This means that it is necessary to set the length of extension 36 to be only slightly greater than the length of the record region of the opto-magnetic recording medium to be laser beam retrieved to minimize the portion which provides excess magnetic flux. When leakage flux is supplied from the surface of the coupling portion between the effective magnetic flux supplying section and core, the total magnetic flux $\phi$ is increased. For this reason, it is desired to dispose core 34 in the neighborhood of extension 36 and dispose electromagnetic coil 32 on core 34. To realize this, the flat lower surface of extension 36 and core 34 may bs disposed such that they extent parallel to each other and in a slightly staggered relation to each other.

As noted above, a magnetic flux from magnetic flux supplying section 37 is provided to opto-magnetic recording film 24 of opto-magnetic recording medium 20. Therefore, the distance between magnetic flux supplying section 37 and yoke 38 is set to be greater than the distance between magnetic flux supplying section 37 and core portion 34. With this arrangement, no gap is provided between magnetic flux supplying section 37 and yoke 38. Consequently, no unnecessary magnetic flux which is not given to opto-magnetic recording film 24 is produced, which would be otherwise produced through a gap of low magnetic reluctance, and thus the total magnetic flux $\phi$ can be minimized.

Magnetic flux supplying section 37 has a tapering shape as noted above. This shape is selected for the following reason. Generally, the area of a section of magnetic flux supplying section 37 taken a plane normal to the long axis of section 37 at a given point thereof, can not be made smaller than quotient of division of the total magnetic flux provided from the outer surface from that point to the end opposite core portion 34 by saturation flux density Bs. Therefore, extension 36 is formed such that its sectional area, and hence outer surface, is reduced as one goes toward its end to minimize the total flux $\phi$ provided into space. The sectional area of magnetic flux supplying section 37 may also be reduced by varying the width thereof. When reducing the width, however, the magnetic field intensity is changed sharply in the vertical direction of opto-magnetic recording film 24 (i.e., direction perpendicular to film 24) and lateral direction of film 24 (i.e., circumferential direction on film 24). This is undesired because increased accuracy of positioning with respect to the retrieval area is required.

Although the total magnetic flux $\phi$ may be reduced, there is a lower limit of (W+t). It will be seen from the comparison of the equations (8) and (11) it is possible to improve the efficiency of magnetomotive force by reducing power consumption by reducing the temperature increase $\Delta T$ of electromagnetic coil 32 at the time of energization and selecting an adequate shape of electromagnetic coil 32. From the equation (11), it will be understood that a change in the value of coil length $\eta$ will cause a greater change in the magnetomotive force than a change in the electronmagnetic coil thickness $\lambda$ does. For this reason, the magnetic field generator according to the invention the coil length $\eta$ is set to be greater than the coil thickness. More specifically, while the magnetomotive force Vm=NI is proportional to the turns number N, with an increase of the wire length required for one turn the resistance per one turn of the wire is increased to increase power consumption. Therefore, instead of increasing the length of the outermost turn of coil by increasing the number of layers of winding the number of layers is reduced to minimize the length of one turn so as to improve the magnetomotive force.

Figure 4:
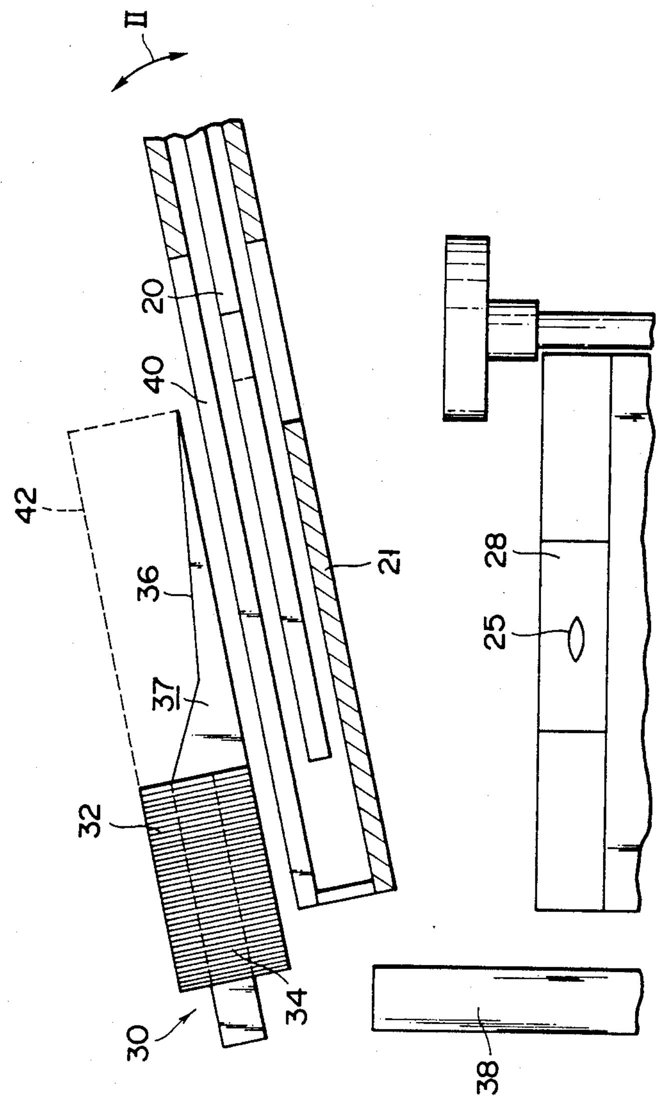
FIG. 4 is a sectional view showing the system shown in FIG. 3 in an operation for loading or ejecting a data recording medium.

While the magnetic field generator adopts a structure subject to less temperature rise, as shown in FIGS. 3 to 5, heat radiator 42 of a high heat conductivity material, e.g., an aluminum radiating plate, is provided on magnetic flux provision section 37. Heat radiator 42 preferably has a fin structure provided with grooves. Such a heat radiation structure can prevent temperature rise of the extension of the core at the time of the energization of the electromagnetic coil.

Figure 12:
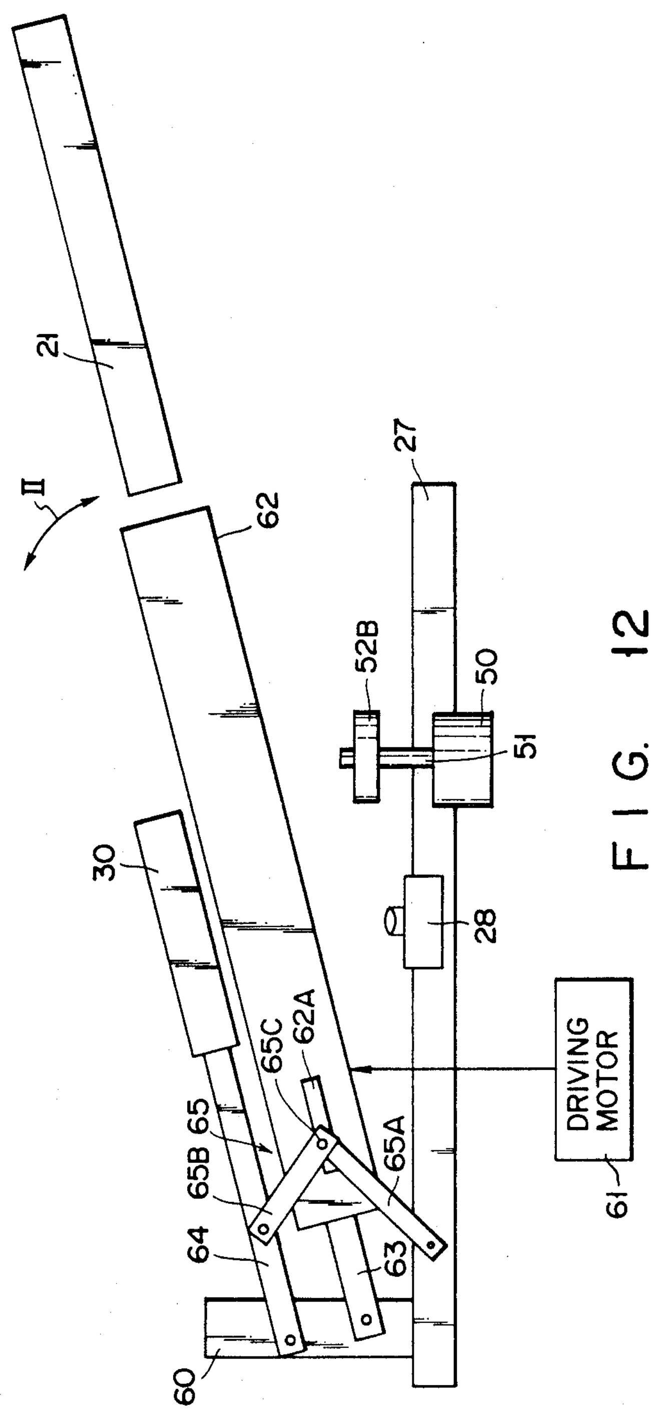

Now, a mechanism for lifting the cassette and magnet unit will be described with reference to FIGS. 12 and 13. As shown in FIG. 12, an optical system including objective lens 25 is provided on base 27 as well as turntable 52B for rotating opto-magnetic disk 20. On base 27 are further provided bucket 62 and magnetic field generator 30, which are vertically movable by driving motor 61 via a guide mechanism (not shown). Bucket 62 and magnetic field generator 30 are coupled to base 27 via link mechanism 65 as shown. Also, they are rotatably coupled to support 60 via their respective arms 63 and 64. Link mechanism 65 has first link 65A, which has one end pivotally coupled to base 27 and the other end provided with free end pin 65C received in slot 62A formed in bucket 62. Free end pin 65C on the other end of link 65A noted above, is further coupled to a cassette holder mechanism for holding a cassette (not shown). The link mechanism also has second link 65B, which has one end pivoted to free end pin 65C on the other end of first link 65A and the other end pivotally coupled to arm 64 for vertically moving magnetic field generator 30.

In the mechanism shown in FIGS. 12 and 13, when cassette 21 is accommodated in bucket 62, the cassette is gripped by the cassette holder mechanism, and an operation of loading the cassette is started. More specifically, link mechanism 65 is operated by driving motor 61 to case descent of bucket 62. When bucket 62 commences to be lowered, free end pin 65C of link mechanism 65 is moved along slot 65A, causing retreat of the holder mechanism in engagement with free end pin 65C, sliding of cassette 21 in bucket 62 and pulling-out of shutter 31 of cassette 21. With the descent of bucket 62, magnetic field generator 30 coupled to bucket 62 via link mechanism 65 is lowered. When the descent of cassette 21 is completed, shutter 31 of cassette 21 is completely pulled out to open the cassette window. Magnetic field generator 30 thus enters bucket 62 and set in a position to oppose the opto-magnetic data recording medium, extension 36 and objective lens 25 to be ready for retrieving or erasing of data. When ejecting cassette 21, a converse operation to the loading operation described above is performed to release the holder mechanism so that it becomes ready to remove cassette 21.

While the lift mechanism described above is utilized for lifting and lowering electromagnet unit 30, it may as well be utilized as a mechanism for lifting and lowering magnet unit 71 having permanent magnet 70 as shown in FIGS. 14 and 15. In the illustrated magnet unit 71 having permanent magnet 70, shaft 72 coupled to permanent magnet 70 is coupled to motor 74. Motor 74 and shaft 72 are accommodated in arm 64 shown in FIGS. 12 and 13, and permanent magnet 70 extends from arm 64. As described above with reference to FIGS. 12 and 13, magnet unit 71 shown in FIG. 14 may be lifted and lowered in accordance with an operation of inserting cassette 21. In this magnet unit, in a recording mode S pole of permanent magnet 70 as shown in FIG. 15 opposes opto-magnetic memory 20, data is recorded in opto-magnetic memory 20 by a laser beam. In an erasing mode, on the other hand, N pole of permanent magnet 70 is brought to face opto-magnetic memory 20 with rotation thereof caused by the rotating motor, and data is erased from opto-magnetic memory 20 by a laser beam. Further, in a reproducing mode, permanent magnet 70 is brought by the rotating motor to a position, at which neither N nor S pole of permanent magnet 70 opposes opto-magnetic memory 20 and the magnetic flux between the N and S poles of permanent magnet 70 is substantially parallel to opto-magnetic memory 20, and data is reproduced from opto-magnetic memory 209 by a laser beam.

With the mechanism as shown in FIGS. 12 and 13, the cassette 21 can be loaded and removed by mere vertical motion, so that it is possible to reduce the size of the mechanism.

As has been described in the foregoing, in a magnet unit incorporating an electromagnet, an elongate electromagnet coil may be formed to permit reduction of the wire length required for one coil turn, so that high magnetomotive force can be obtained with low power consumption. Further, since it is possible to form an elongate electromagnetic coil, an enhanced heat radiation effect can be obtained, so that the coil can be heated for long time without heating. Further, since the surface area of the extension of the core is set to be smaller than the surface area of the yoke portion, it is possible to maintain a sufficiently high magnetic potential on the core extension and provide a magnetic field of a sufficiently high intensity to the data recording medium. Further, since the magnetic flux provision section has a tapering shape such that its sectional area reduces as one goes along its long axis from its portion coupled to the core, less leakage flux is supplied from the magnetic field provision section. Thus, it is possible to increase the efficiency of utility of magnetism and reduce power consumption.

Further, the magnet unit is vertically moved by the lift mechanism in a timed relation to the operation of the cassette insertion. Therefore, the apparatus can be simplified and reduced in size.

What is claimed is:

1. An apparatus for applying a magnetic field to an opto-magnetic recording medium, comprising:

a magnetic core member;

means wound around said core member, for generating a magnetic flux in said core;

a magnetic extending member extending from said core member and having a flat surface opposing the opto-magnetic recording medium, the magnetic field being applied from said surface to said opto-magnetic recording medium, said extending member having a long axis, and a tapering shape with the cross-sectional area oriented orthogonally to the long axis, and a tapering shape with the cross-sectional area continuously reduced along said long axis; wherein said core member has an axis, and said extending member has a long axis parallel to said axis; and a magnetic yoke member magnetically coupled to said core member so that a magnetic field passing through said opto-magnetic recording medium is returned to said yoke member.

2. An apparatus for applying a magnetic field to an opto-magnetic recording medium, comprising:

a magnetic core member;

means wound around said core member, for generating a magnetic flux in said core member;

a magnetic extending member extending from said core member to form an inverted T-shaped profile together with said core member and having a flat surface opposing an opto-magnetic recording medium, the magnetic field being applied from said flat surface onto said opto-magnetic recording medium, said extending member having a long axis, a cross-sectional area oriented orthogonally to the long axis, and a tapering shape with the cross-sectional area continuously reduced along said long axis; wherein said core member has an axis, and said extending member has a long axis parallel to said axis; and a magnetic yoke member magnetically coupled to said core member so that a magnetic field passing through said opto-magnetic recording medium is returned to said yoke member.

3. The apparatus according to claim 2 wherein said core member and said yoke member are separably coupled to each other.

4. The apparatus according to claim 2, wherein said extending member has an opposite surface opposite to said flat surface, and said core member projects from said opposite surface.

5. The apparatus according to claim 4, wherein said core member is provided on the center of said opposite surface of said extending member.

* * * * *

UNITED STATES PATENT AND TRADEMARK OFFICE
CERTIFICATE OF CORRECTION

PATENT NO. : 4,984,225

DATED : January 08, 1991

INVENTOR(S) : HIDEO ANDO

It is certified that error appears in the above-identified patent and that said Letters Patent is hereby corrected as shown below:

On the Title page

In the Abstract, Line 7, "emerged" should be --emerges--;

Claim 1, Column 16, Line 18, after "axis," insert --a cross-sectional area oriented orthogonally to the long axis,--.

Signed and Sealed this

Twenty-ninth Day of December, 1992

*Attest:*

DOUGLAS B. COMER

*Attesting Officer*

*Acting Commissioner of Patents and Trademarks*